June 12, 1928. Re. 16,994

J. COHN

SAFETY ATTACHMENT FOR TANKS

Original Filed July 26, 1924

INVENTOR
Jacob Cohn
BY C. P. Siegel
ATTORNEY

Reissued June 12, 1928. Re. 16,994

UNITED STATES PATENT OFFICE.

JACOB COHN, OF NEW YORK, N. Y., ASSIGNOR, BY MESNE ASSIGNMENTS, TO MIDWEST STEEL AND SUPPLY CO., INC., OF NEW YORK, N. Y., A CORPORATION OF NEW YORK.

SAFETY ATTACHMENT FOR TANKS.

Original No. 1,570,461, dated January 19, 1926, Serial No. 728,336, filed July 26, 1924. Application for reissue filed August 5, 1927. Serial No. 210,968.

The present invention relates to improvements in safety attachments for tanks and has for an object to provide for the venting of the excessive accumulated pressure in such tanks as gasoline tanks.

Another object of the invention is to provide a simple, compact and inexpensive device readily attachable to gasoline and other tanks, which may be set to relieve accumulated pressure beyond a predetermined degree therein and which device will be readily accessible from the exterior of the tank for the purpose of making adjustments, repairs and replacement of parts.

One of the essential features of the invention resides in the provision of an automatically acting relief valve for the high pressure gases, and it is an object of the invention to provide supporting and guiding means for this valve together with means whereby said guiding means and the valve may be handled as a unit and applied to or detached from a filling bushing attached to the wall of the tank or container.

It is also an additional object of the invention to provide a filling bushing of novel construction having means for limiting the insertion of a fuel supply nozzle therethrough and for venting the displaced air from the interior of the tank around the supply nozzle.

A further object of the invention lies in providing at attachment for tanks of this character in which the margin of safety will be high and in which any conflagration will be prevented from spreading to the contents of the tank.

With the foregoing and other objects in view, the invention will be more fully described hereinafter, and will be more particularly pointed out in the claims appended hereto.

In the drawings, wherein like symbols refer to like or corresponding parts through the several views,—

Referring more particularly to the drawings, 5 designates the tank wall having the opening about which extends the filling neck 6, which is externally threaded.

Figure 2:
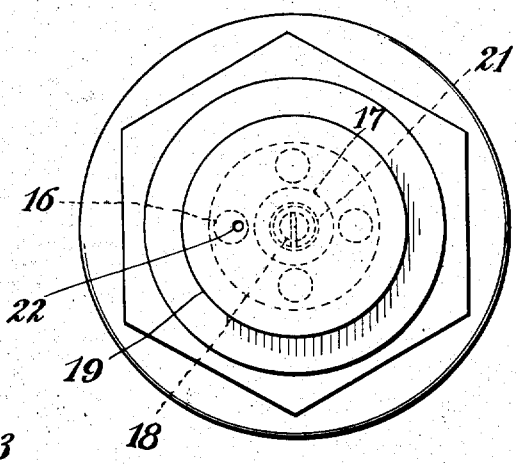
Figure 2 is a top plan view of the attachment in assembled condition.

According to the invention the attachment forms a unit supported from the bushing composed in part of an intermediate substantially horizontal ring 30 adapted to lie over the upper end of the filling neck 6. A depending flange or rim 10 from the ring 30 is internally threaded to cooperate with the threads upon the filling neck in order that the bushing may be secured tightly in place and a washer 32 is preferably interposed between the ring 30 and the upper edge of the filling neck to avoid the escape of fumes and gases from the tank except under the control of the relief valve, as hereinafter described. The ring 30 also provides convenient attachment whereby the flange 10 may be screwed and unscrewed from the neck and to this end, said ring is preferably made with straight faces, as for instance of the hexagonal shape shown in Fig. 2, to receive a wrench. The inner edge of the ring 31 carries a skirt or inside boss 7, which is annular in form and which is spaced inwardly from the flange 10, said skirt depending down into the neck 6 and adapted to receive the safety cylinder which is composed preferably in part of the perforated metal 8 and the mesh 9. The safety cylinder is secured in the skirt as for instance by pressing the material thereof into the annular groove 33 in the outer surface of the skirt. Sufficient space is left between the skirt 7 and the filling neck 6 to insert the safety cylinder into the tank without having to squeeze it through the filling neck or without requiring that the cylinder, which is essentially of a relatively delicate nature be injured by striking it against any of the rigid parts.

The bushing further comprises the upstanding collar 11, which rises approximately in line with the filling neck, and is therefore, of greater diameter than the skirt 7, and is connected with said skirt by the annular shoulder 11′. External threads 13 are provided upon the outer portion of the collar 11 and the inner surface of the flange 12 of the cap 14, which may be readily disengaged by rotary movement whenever the tank is to be filled. The cap 14 is adapted to compress a gasket 34 against the upper end of the collar 11 to avoid the escape of the gases and fumes about the threads 13.

Figure 1:
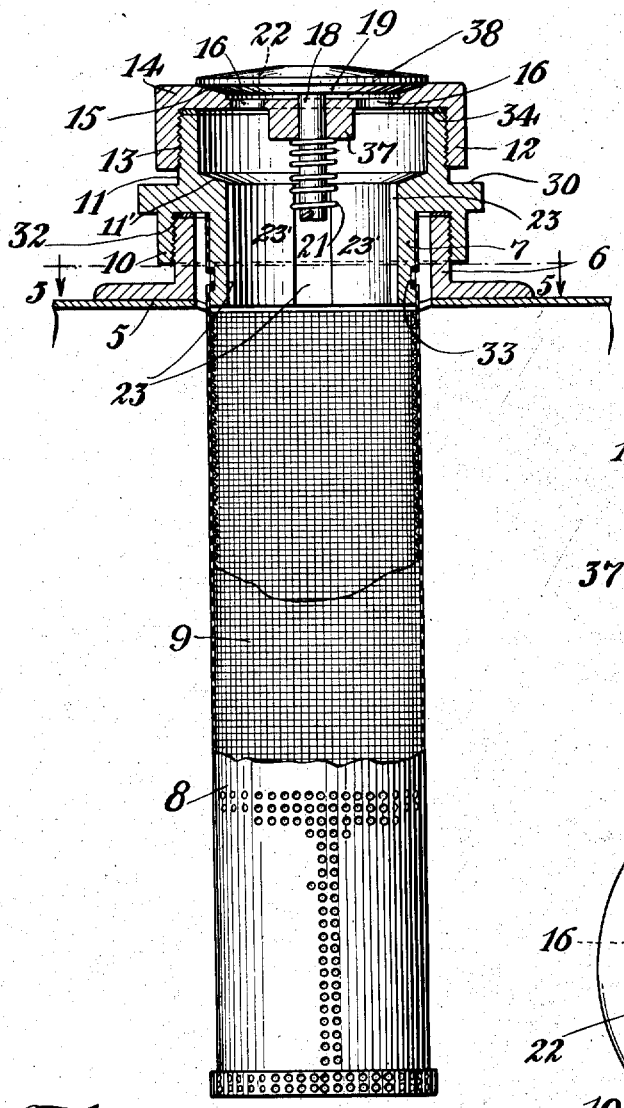
Figure 1 is a vertical section through a portion of a tank and an improved safety attachment constructed according to the present invention.
Figure 3:
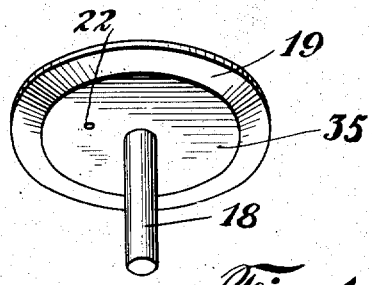
Figure 3 is a perspective view of the valve.
Figure 4:
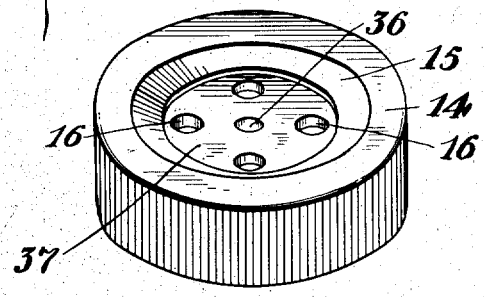
Figure 4 is a similar view of the cap showing the valve seat.

The upper surface of the cap 14 is disclosed to advantage in Fig. 4, showing that in such upper surface is provided an inverted frusto-conical valve seat 15 of considerable depth and area, to accommodate the mutual ground surface 19 of the valve 35, which is of the disc type, and of an extensive area within, in order that the effect of the accumulated pressure may be efficiently felt in the valve. The valve is further provided with a vent opening 22 to permit breathing of the tank and a post 18 extending downwardly from the center of the valve disc is adapted to enter the central perforation 36 in the cap 14, the cap being enlarged as indicated at 37 in Fig. 1, in order to reinforce the material at this point and to provide an abutment against which the upper end of the coil spring 21 operates. The coil spring is wound in a suitable number of convolutions about the valve post 18 and is secured at its lower end to the valve post, so that the function of this spring is to urge the valve to a closed position shown in Fig. 1. The depressed surface 37′ of the cap 14 immediately adjacent the lower part of the valve seat and spaced slightly therebelow is formed with a number of openings 16 to permit the pressure within the tank to ascend into contact with the lower surface of the valve 35 as shown in Fig. 1. A chamber 38 is shown to exist between the lower surface of the valve and the upper surface of the depressed part 37′ of the valve cap, so that although the pressure is led into the chamber 38 at spaced points where the perforations 16 are located, nevertheless the effect of the pressure is felt uniformly throughout all surface parts of the valve 35, and the valve is lifted evenly from its seat to permit of the escape of pressure, when such pressure accumulates to a degree to overbalance the spring 21. The spring is selected to be of a strength required by local conditions.

In the use of the device, the attachment is mounted upon the tank as shown in Fig. 1 by simply causing such device to replace the usual closure cap. The safety cylinder extends into the tank and any gases and fumes accumulating must pass through the foraminous and reticulated walls of the cylinder. Once within the cylinder these gases ascend freely into the interior of the bushing where the gases are trapped, and it will be obvious that because of the length of the skirt 7 and of the collar 11 a chamber of substantial depth is provided for holding gases of considerable mass and volume under a relatively great head. Of course, the operation of this head is regulated by the spring 21, but the gases will be trapped within the large chamber in the bushing, as this chamber is higher than the tank and the gases will not escape back to the tank, and should these gases become ignited for any reason, the conflagration will be prevented from spreading back to the contents of the tank, because of the foraminous and reticulated safety cylinder. As the pressure ascends above the predetermined degree, the valve 35 will be lifted from its seat 15 and the pressure escapes to the atmosphere until the reduction is such as to permit the spring to again seat the valve. This action is entirely automatic, and the device effectually prevents the accumulation of dangerous high pressures within the tank.

When filling the tank, the cap 14 is removed by rotation or unscrewing and a nozzle is inserted directly into the bushing. To permit the tank to breathe during the filling operation grooves 23 are made longitudinally in the side walls of the skirt 7, which permits air to be forced out of the tank by the incoming liquid without interference from the filling nozzle.

Figure 5:
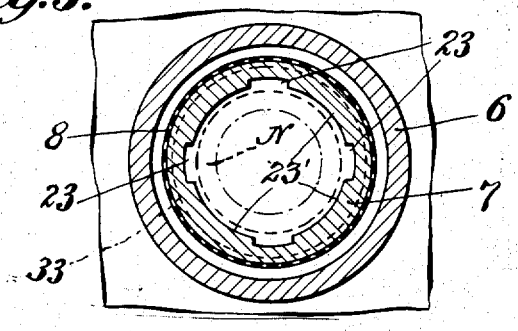
Figure 5 is a horizontal sectional view taken substantially on the line 5—5 of Fig. 1.

These grooves or channels 23 provide spaced lugs or ribs 23′ therebetween upon the upper ends of which at the shoulder 11′ the fuel nozzle is supported. This nozzle indicated at N in Fig. 5 of the drawings, is generally of tapered form, and its insertion through the bushing is thus limited by the lugs 23′, insuring unobstructed outlet passages for the air displaced from the tank through the grooves or channels 23.

It will be noted, that the pressure relief valve and its guide means are carried by the cap 14 or other equivalent part for attachment to the filling bushing or detachment therefrom as a single unit. Thus, the valve guide means presents no obstruction to the insertion of the fuel supply nozzle or the free flow of the fuel therefrom into the foraminous cylinder 8.

After removal of the nozzle the cap 14 is replaced and as liquid is drawn off from the tank air may enter through the perforation 22 in the valve to avoid the formation of a partial vacuum which would interfere with the drawing off of the contents.

The device lends itself particularly to use with gasoline tanks where the liquid is extremely volatile and inflammable. In the present instance I have shown a device which is applicable to the filling neck as now provided upon the gasoline tanks of automobiles. However, if desired, it is to be understood that the bushing 30 may be attached directly and permanently to the wall of the tank around the opening therein.

It is obvious that various changes and modifications may be made in the details of construction and design of the above specifically described embodiment of this invention without departing from the spirit thereof, such changes and modifications being restricted only by the scope of the following claims.

Having thus described my invention, what I desire to secure by Letters Patent of the United States is:

1. A safety attachment for tanks having a filling neck comprising a bushing secured to said filling neck, a foraminous cylinder carried by said bushing, a cap secured upon said bushing and having a valve seat with a depressed portion below the inner lower edge of the valve seat providing a chamber, said chamber having communication through said depressed portion by a passage of relatively limited area, a valve having an edge adapted to close against said seat, and means for yieldably holding said valve against its seat.

2. A safety attachment for tanks having filling necks comprising a bushing having removable attachment to said filling neck, a screen cylinder carried by said bushing and extending into the tank, a cap removably secured upon the outer portion of said bushing and having a conical valve seat upon its upper surface with a depressed portion just below the inner lower edge of the valve seat providing a chamber, said chamber having communication with the interior of the screen cylinder through said depressed portion by a passage of relatively limited area, a valve having a conical valve seat fitting against said conical valve seat of the cap, and resilient means for yieldably holding said valve against its seat.

3. A safety attachment for tanks comprising a bushing removably secured to the tank and having an upstanding collar housing an enlarged gas chamber in communication with the interior of the tank, a skirt on said bushing, a screen cylinder carried by said skirt, a cap removably secured to said collar and having an extensive gently sloping conical seat, with a slightly depressed portion below the inner edge of the seat providing a chamber, said last-named chamber having communication with said enlarged gas chamber through said depressed portion by a passage of relatively limited area, a valve having a gently sloping ground surface adapted to rest on said seat, the lower surface of said valve when closed adapted to be spaced from said depressed portion, and means carried by said cap for yieldably holding the valve seated.

4. In a safety attachment for fuel supply tanks, a filling bushing adapted for attachment to the tank wall having a reduced portion providing an annular shoulder limiting the insertion of a fuel supply nozzle through said bushing, a foraminous cylinder surrounding said portion of the bushing and fixedly secured thereto, the inside of the bushing being internally provided with spaced longitudinally extending channels permitting the free egress of displaced air from the tank through said foraminous cylinder.

5. In combination with a fuel supply tank having an opening surrounded by a neck, of a bushing having a rim to encircle said neck and be secured thereto, said bushing having a boss within said rim projecting into the neck, a perforated cylinder attached to said boss, said boss having axially extending ribs on its inside surface, a cap to close the outer end of the bushing, and an outwardly opening perforated valve mounted in said cap.

6. A safety attachment for a tank having a filling mechanism comprising a bushing having a depending flange to be screwed upon and surround said neck, the bushing also having a boss inside of said flange to project into the neck, said bushing having an inside shoulder and ribs on its interior surface extending from said shoulder along the inside of said boss, a collar on the bushing to project away from said neck, a cap to be attached to said neck and carrying a valve seat, the cap having a depressed portion below the valve seat, said portion having openings to establish communication with the inside of the bushing, and a valve carried by the cap and movable into and out of engagement with said seat.

7. In a safety attachment for fuel supply tanks, a filling bushing adapted for attachment to the tank wall consisting of a one-piece integral structure having a reduced end portion and means adapted for attachment to the tank wall externally of the filling opening therein, a foraminous cylinder surrounding said end portion of the bushing and fixedly secured thereto for insertion through the filling opening, and said end portion of the bushing being internally provided with spaced axially extending ribs with the outer ends of which a fuel supply nozzle inserted through the bushing is adapted to be engaged to support said nozzle in spaced relation to the parts of the bushing wall between said ribs and thereby afford unobstructed passages permitting free egress of displaced air from the tank through said foraminous cylinder and the bushing.

In testimony that I claim the foregoing as my invention, I have signed my name hereto.

JACOB COHN.